United States Patent

[11] 3,593,007

| [72] | Inventor | Lamont J. Seitz<br>Tujunga, Calif. |
|------|----------|------------------------------------|
| [21] | Appl. No. | 675,165 |
| [22] | Filed | Oct. 13, 1967 |
| [45] | Patented | July 13, 1971 |
| [73] | Assignee | Baxter Laboratories, Inc.<br>Morton Grove, Ill. |

[54] ELECTRONIC DIGITAL CONVERTER AND READOUT UNIT
1 Claim, 5 Drawing Figs.

[52] U.S. Cl. .................................................. 235/92,
340/347
[51] Int. Cl. ...................................................... G06m 3/06
[50] Field of Search ........................................ 340/347;
235/92

[56] References Cited
UNITED STATES PATENTS

| 3,439,271 | 4/1969 | Metcalf | 324/99 |
| 3,111,662 | 11/1963 | Pierce | 340/347 |
| 2,994,825 | 8/1961 | Anderson | 328/129 |
| 2,840,806 | 6/1958 | Bateman | 340/347 |
| 2,963,697 | 12/1960 | Giel | 340/347 |
| 3,160,811 | 12/1964 | Muniz | 324/99 |
| 3,124,355 | 3/1964 | Mentzer | 273/54 |

FOREIGN PATENTS

| 1,064,810 | 12/1965 | Great Britain | 340/347 |

*Primary Examiner*—Maynard R. Wilbur
*Assistant Examiner*—Robert F. Gnuse
*Attorneys*—Walter C. Kehm, Richard J. Reilly and Samuel B. Smith, Jr.

ABSTRACT: An electronic instrument is described herein for use in conjunction with a spectrophotometer, and the like, and which is capable, for example, of converting optical transmission readings of a sample under test into a logarithmic scale, so as to provide calibrated readings directly indicating the optical density of the sample at the selected wave lengths, or which may directly indicate the percent concentration of the particular impurity in the sample. The instrument in one of its embodiments, as will be described, includes circuitry for digitizing analog readings from the spectrophotometer directly into a logarithmic scale; and it also includes a simple printer, or equivalent unit, for printing, or otherwise displaying, the corresponding, calibrated logarithmic readings indicative of optical density or percent concentration.

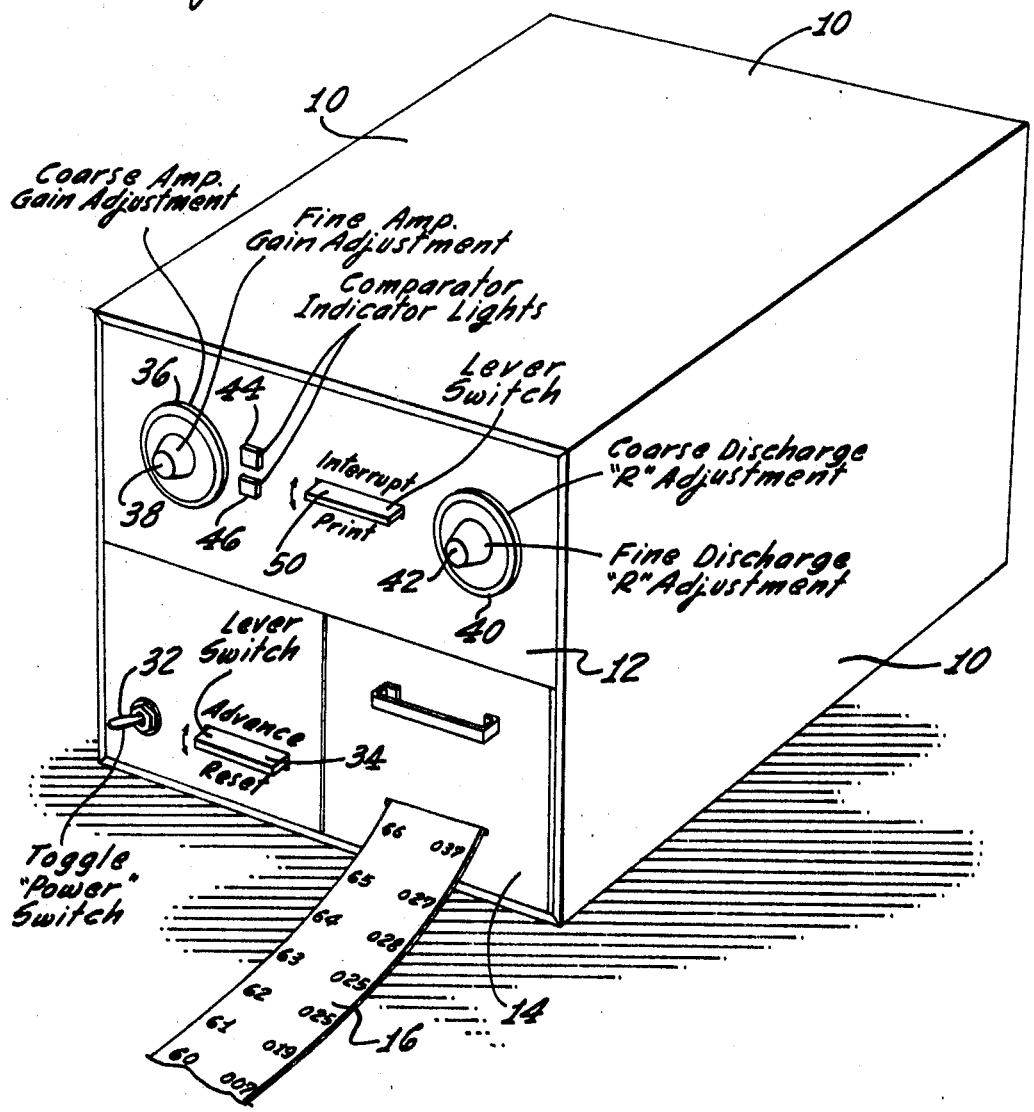

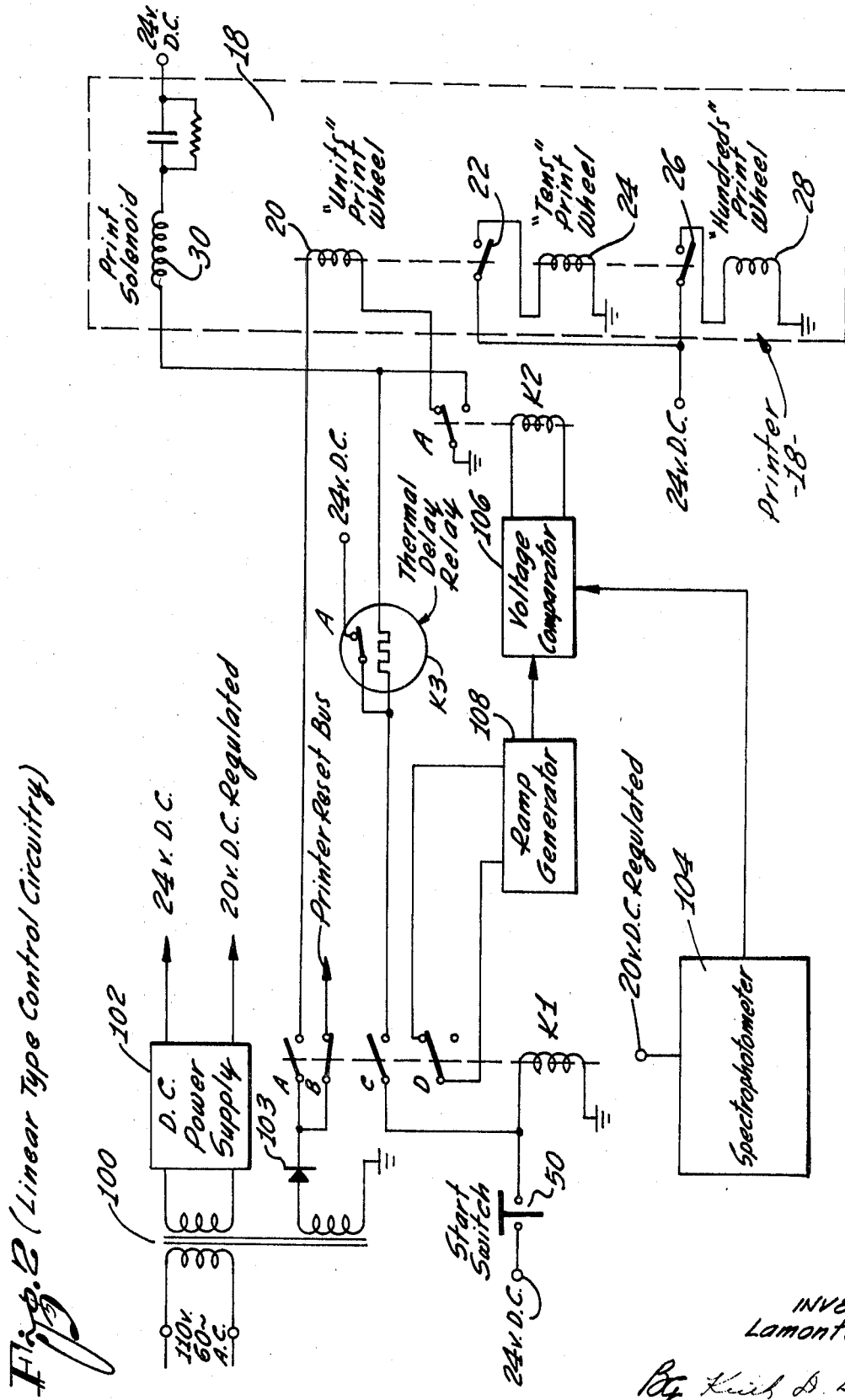

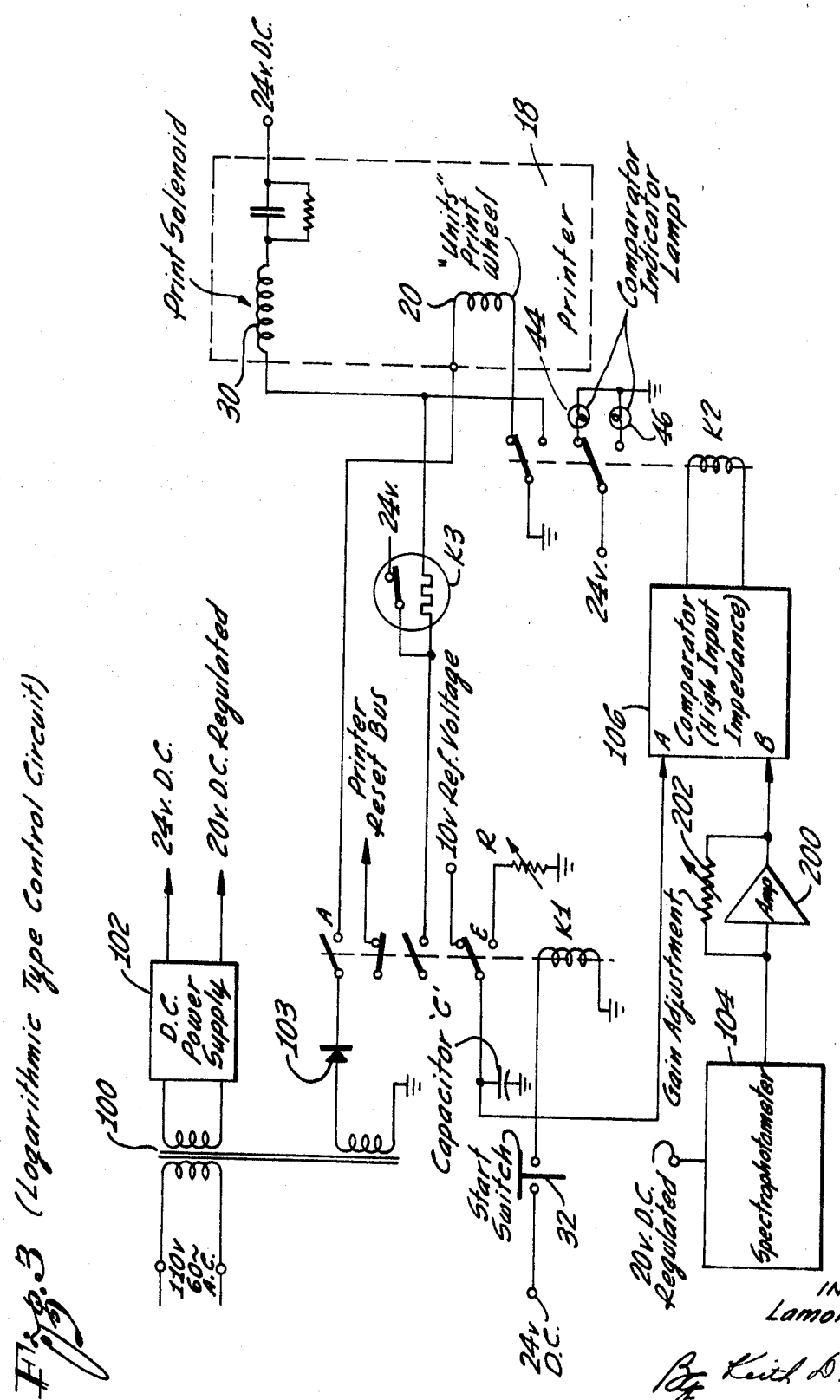

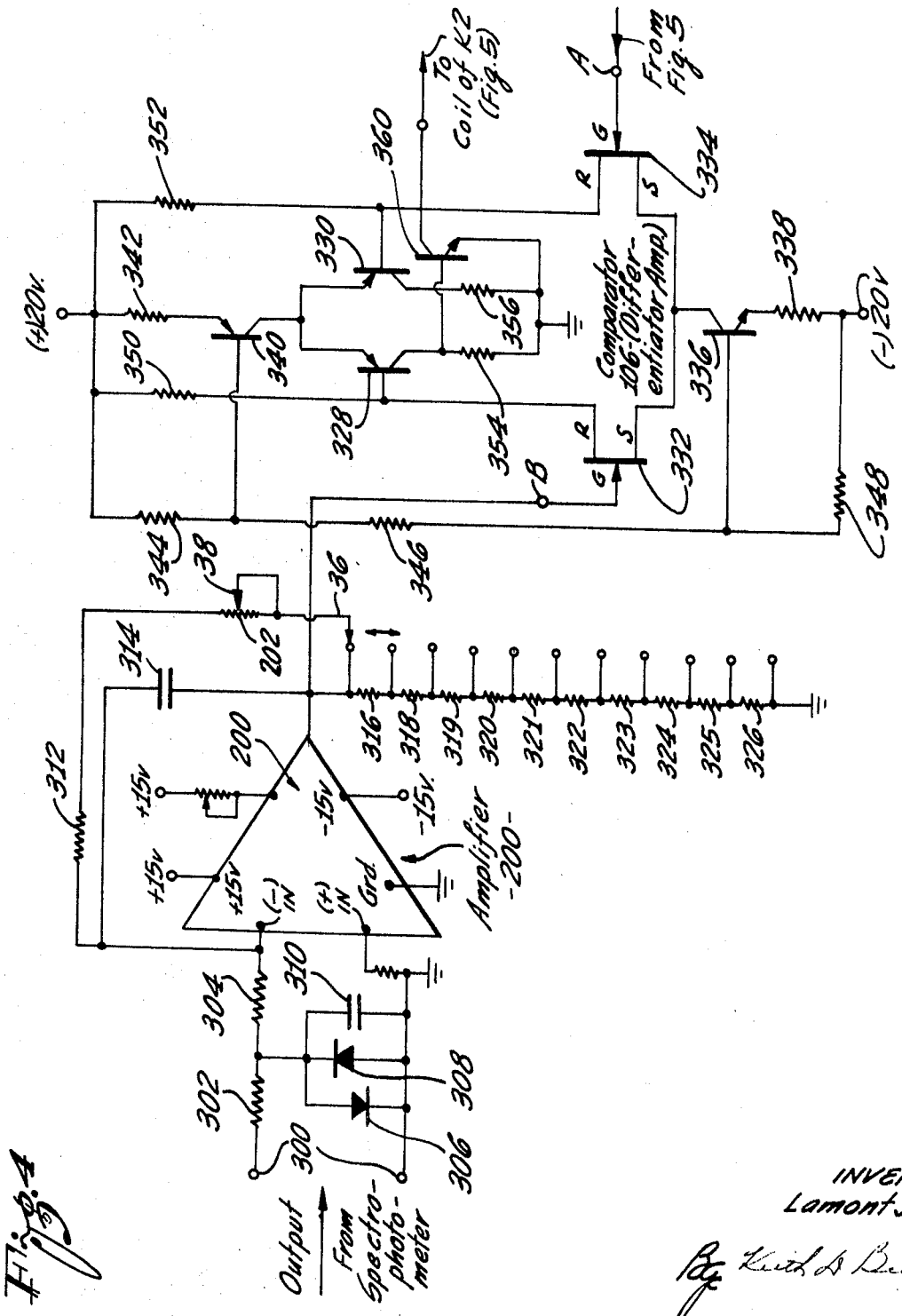

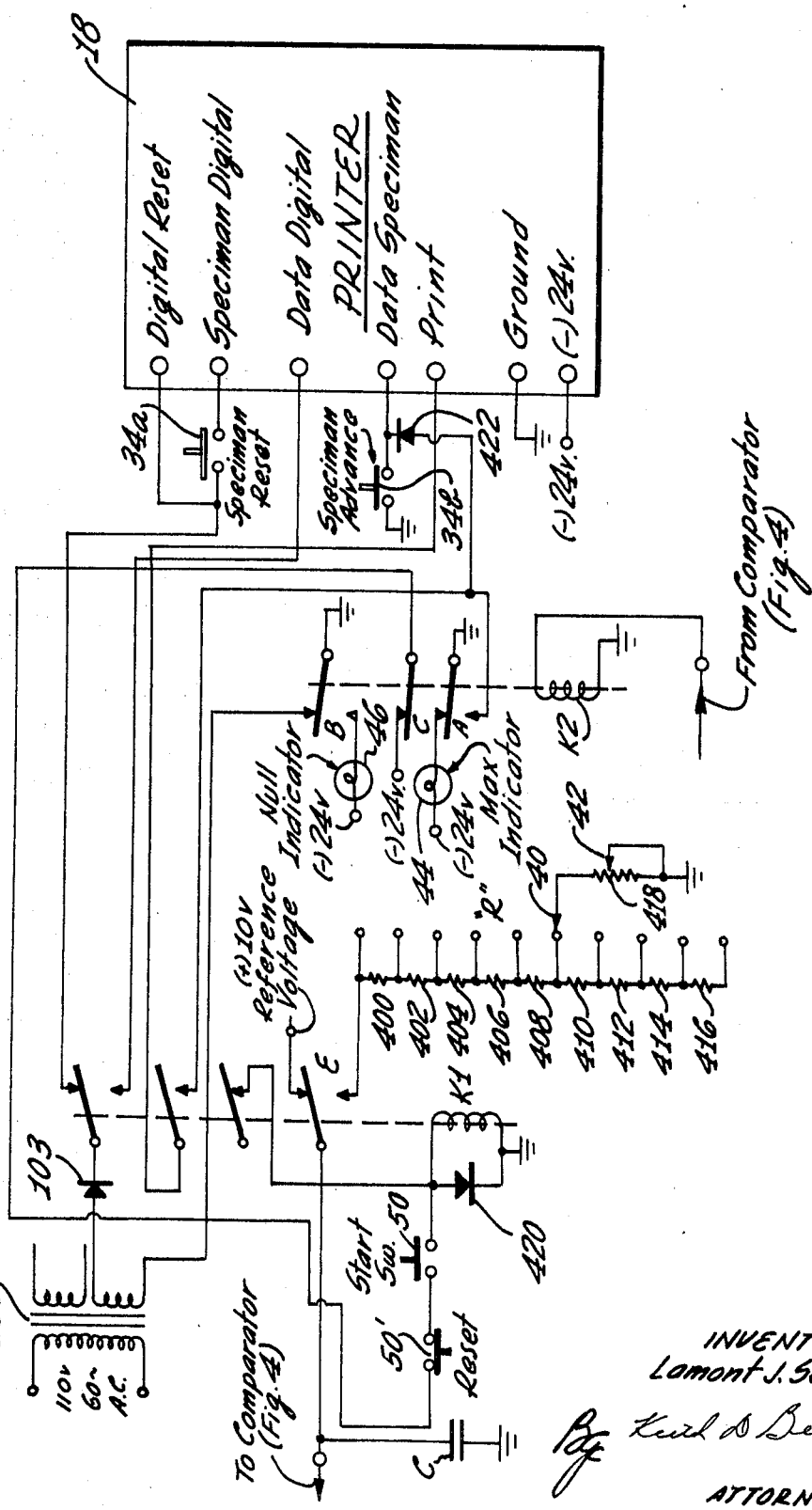

3,593,007

ELECTRONIC DIGITAL CONVERTER AND READOUT UNIT

BACKGROUND OF THE INVENTION

As is well known, spectrophotometric analysis is a method of chemical analysis based on the absorption by the particular impurity in the sample under test of light of a specified wavelength. The instruments used for this purpose are known as spectrophotometers, and these instruments are capable, by selecting different wavelengths of light incident on the sample, of measuring the percent concentration of various known impurities in the sample.

A simple spectrophotometer comprises a source of light, together with some means for dispersing the light so that only a limited band is directed through the sample; and a photodetector is also provided for producing an analog electrical signal having an amplitude indicative of the amount of light transmitted by the sample at the selected wavelengths, this value being usually referred to as "optical transmission."

Although not limited to spectrophotometry, the instrument of the invention finds particular utility when used in conjunction with present day spectrophotometers. Such spectrophotometers, for example, provide readings corresponding to the optical transmission, or transmittance, of the sample under test, and these readings are converted, in accordance with the prior art practice, by appropriate logarithmic conversion charts, or the like, into "optical density," or "absorbence" readings which have a direct relationship to the percent concentration of the impurity in the sample, which is the result desired.

The present invention provides a simple and relatively inexpensive electronic instrument which is capable, for example, of responding to the analog output of a spectrophotometer, representative of the optical transmission of the sample at the selected wavelengths, and of converting that analog output into a reading of the optical density of the sample at the particular wavelengths used during the test. Moreover, the instrument may be directly calibrated in "percent concentration," since it has a linear relationship with "optical density," so that the percent concentration of the particular impurity may be indicated directly by the instrument.

The instrument of the invention functions to provide the results described in the preceding paragraph by digitizing the analog output from the spectrophotometer, which represents optical transmission, and by actuating a counter/printer unit by the resulting pulses over a particular time interval. The time interval is determined, in one embodiment, by the exponential discharge curve of a resistance-capacitance circuit so that the desired logarithmic conversion from optical transmission to optical density may be provided.

A feature of the particular instrument to be described is the use of the usual 110-volt 60-cycle alternating current mains as the standard for the digitized pulses. By this expedient, a very simple circuit provides output pulses having a uniform repetition rate, and one which is held uniform by the rigid standards of the usual alternating current mains.

Another feature of the invention is that it may have a modular construction. This permits other logic circuits to be substituted for the particular resistance-capacitance discharge circuit mentioned above, for other conversions. For example, the instrument may have a linear relationship, so that its readings may have a linear relationship to the analog input, rather than the above-described logarithmic relationship. Moreover, other modular circuits may be inserted, so that the readings may have an inverted logarithmic relationship, such as achieved, for example, by charging the resistance-capacitance network, rather than by discharging the network.

BRIEF DESCRIPTION OF THE DRAWINGS

FIG. 1 is a perspective view showing a unit constructed to incorporate the concepts of the present invention;

FIG. 2 is a diagram, partly in circuit form and partly in block form, showing a linear type of control circuitry for use in the instrument of FIG. 1;

FIG. 3 is a diagram, like the diagram of FIG. 2, and showing a logarithmic type of control circuit for use in the instrument; and FIGS. 4 and 5 are circuit diagrams, showing in more detail the logarithmic type control circuit of FIG. 3.

DETAILED DESCRIPTION OF THE ILLUSTRATED EMBODIMENTS

The instrument shown in FIG. 1 includes, for example, a rectangular housing 10 and a front panel 12. A drawer 14 has a front wall forming part of the front panel. The drawer includes, for example, an electromechanical counter/printer unit which is capable of responding to input pulses and recording output information corresponding to the number of pulses received in decimal form on a record, such as a paper tape 16.

The counter/printer unit, as designated 18 in the schematic representation of FIG. 2, may be of the type manufactured by the Presin Co., Inc. of Bridgeport, Conn. The printer 18, for example, includes a solenoid coil 20 which responds to input pulses to turn a "units" print wheel from one angular position to the next. When the "units" print wheel reaches the "10" position, a switch 22 in the unit is closed, and this activates a solenoid 24 which, in turn, turns the "tens" print wheel of the unit from one angular position to the next. Likewise, when the "tens" print wheel reaches the "100" position, a switch 26 is closed which energizes a solenoid 28, and the latter solenoid, in turn, turns the "hundreds" print wheel of the printer from one position to the next.

The counter/printer unit, therefore, serves to count the incoming pulses, and to provide the total count on the aforesaid series of printing wheels controlled by the solenoids 20, 24 and 28. The printer also includes a print solenoid 30 which, when activated, causes the information established by the print wheels to be printed on the tape 16. Appropriate resetting means (not shown) is also provided which may be controlled to return all the print wheels to zero.

Two additional print wheels, for example, in the unit 18 may be controlled to provide a sequence indication so as to identify the different samples whose test results are recorded by the instrument. That is, the first output to be printed, and which corresponds to the first sample, may be designated "01"; the second as "02"; the third as "03"; and so on. These sample identification print wheels may also be reset by actuation, for example, of a lever switch 34 on the front panel 12 in FIG. 1. Also, the sample identification print wheels may be advanced from one position to the next manually, by moving the switch 34 to the upper position.

Also included on the front panel is a toggle switch 32 which may serve as the power switch for the instrument.

The other controls shown on the front panel of FIG. 1 will be described in more detail in conjunction with the circuit diagram of FIGS. 4 and 5. These latter controls include, for example, a knob 36 which, when turned, serves to switch more or less resistance into the gain control of an amplifier, whereas 38 is a knob which controls a potentiometer in the amplifier gain control. In this manner, 36 forms a coarse gain control for the amplifier, and 38 forms a fine gain control.

A control knob 40 on the front panel serves to switch resistance values into the discharge path of a capacitor in the circuit to be described in conjunction with FIGURES 4 and 5 so as to form a coarse discharge adjustment for the capacitor; whereas the knob 42 controls a potentiometer to provide a fine discharge adjustment.

Likewise, a pair of indicator lamps for a comparator included in the circuits to be described, are shown as 44 and 46. When the circuit is energized and started, the lamp 44 glows, for example, to indicate inequality between signals applied to the comparator. Then, when equality is reached in the comparator, the lamp 46 glows and the lamp 44 is extinguished.

For convenience, these lamps may be provided with appropriate filters, so that they glow in different colors.

A further lever switch 50 may be provided, so as to enable an operator manually either to interrupt the printing of a particular sample, by moving the switch to the upper position, or to start the measuring operation by moving the switch to the lower position. Suitable known circuitry, not shown, may be provided to carry out the aforesaid functions of the switch 50.

In the circuit of FIG. 2 is a transformer 100 is provided which has a primary winding connected to the usual 110-volt 60-cycle alternating current mains. A first secondary winding of the transformer 100 energizes a usual direct current power supply 102, so that a 24-volt direct current voltage may be obtained, as well as a 20-volt direct current regulated voltage. Suitable circuits for producing these voltages are well known to the art, and need not be shown in detail here.

A second secondary winding of the transformer 100 is connected through a diode rectifier 103, and through a pair of normally open contacts A of a relay K1 to the aforesaid "units" print wheel solenoid 20 of the printer 18. It will be appreciated that the diode rectifier 103 serves effectively to digitize the alternating current appearing across the transformer winding 100, and when the contacts A are closed by energizing the relay K1, 60-cycle digitized "pulses" are applied to the solenoid 20. These pulses cause the units "units" print wheel to turn from one angular position to the next for each successive pulse.

The aforesaid pulses are also applied through a pair of normally closed contacts B of the relay K1 to a print wheel reset bus (not shown) in the printer 18. When the pulses are applied to the last-mentioned bus, the print wheels in the printer 18 are all returned to zero.

The start switch 32 in the circuit of FIG. 2, when closed, energizes the relay K1. The relay has a pair of holding contacts C which are connected through a pair of normally closed contacts A of a thermal delay relay K3 to the positive terminal of the 24-volt direct-voltage source. The holding contacts C of the relay K1 are also connected through the energizing element of the thermal relay K3 to a pair of normally open contacts A of a relay K2 and to the print solenoid 30 of the printer 18. The movable contact of the normally open contacts A of the relay K2 is grounded. The relay K2 also includes a pair of normally closed contacts which complete a connection from ground to the "units" print wheel solenoid 20 of the printer 18.

When the readout instrument of the invention is used in conjunction with a spectrophotometer designated by the block 104 in FIG. 2, the 20-volt regulated direct current voltage from the power supply 102 may be used to energize the spectrophotometer. As mentioned above, the spectrophotometer develops an analog output signal, which is representative, for example, of the optical transmission or "transmittance" of the sample under test. This analog signal is applied to a voltage comparator 106, as is the output of a ramp signal generator 108. Both the units 106 and 108 may have any appropriate known construction.

For example, the ramp generator 108 may have a usual construction so as to generate a linearly increasing ramp signal when the normally closed contacts D of the relay K1, which are connected across the input of the ramp generator, are opened. The voltage comparator 106, on the other hand, may have any known circuitry, so as to generate an output when the ramp signal from the ramp generator 108 reaches an amplitude corresponding to the amplitude of the analog signal from the spectrophotometer 104. When that occurs, the relay K2 is energized.

It will be appreciated, that so long as the ramp signal generated by the generator 108 has a linear characteristic, there is no conversion accomplished in the circuit of FIG. 2; in that the values printed by the printer 18 bear a direct relationship to the analog signal produced by the spectrophotometer 104. The circuit may be calibrated so that the values printed by the printer on the tape 16 of FIG. 1 represent directly the optical transmission, or transmittance, of the sample tested by the spectrophotometer.

It will be appreciated, therefore, that when the start switch 32 is closed and released, the relay K1 is energized. The holding contacts C maintain an energizing current for the relay K1 through the normally closed contacts A of the thermal delay relay K3, after the start switch has been released.

When the relay K1 is energized, the contacts A close, so that the 60-cycle pulses from the rectifier 103 are applied to the "units" print wheel 20 of the printer 18. The print wheels of the printer then begin to turn, and to count the pulses applied to the printer, in the manner described above.

At the same time, a pair of normally closed contacts D of the relay K1 are opened, so that the ramp generator 108 starts to generate the aforesaid linearly increasing ramp signal. The amplitude of the ramp signal increases on a linear scale until it reaches the amplitude of the analog signal from the spectrophotometer 104. At that time the voltage comparator 106 energizes the relay K2.

The energizing of the relay K2 causes the normally closed contacts of the relay K2 to open, so that the print wheels of the printer are stopped at the count achieved when the aforesaid ramp signal and analog signal equality was sensed by the comparator 106. The normally open contacts A of the relay K2 close, so as to energize the print solenoid 30 which, in turn, causes the number represented by the print wheels of the printer 18 to be printed on the paper tape 16. Also, the thermal delay relay K3 is energized and, after a time interval sufficient to permit the aforesaid printing to be carried out, it opens its normally closed contacts A to deenergize the relay K1. The contacts B of the relay K1 now close to reset the printer, and the instrument is ready for the next sample.

The circuit of FIG. 3 is intended to replace the circuit of FIG. 2 when, for example, it is desired to perform a logarithmic conversion so as to convert the optical transmission readings of the spectrophotometer 104 into "optical density" or, directly to "percent concentration" readings as discussed above.

Expressed mathematically, the relationships are as follows:

$$O.D. = \log_{10} \frac{100}{\%T} \quad (1)$$

where: O.D. is the "absorbence" or "optical density" of the sample being tested. T is the "transmittance" or "optical transmission" of the sample as measured by the spectrophotometer.

$$\frac{O.D._{STD}}{conc_{STD}} = \frac{O.D._{sample}}{conc_{sample}} \quad (2)$$

where: $O.D._{STD}$ is the optical density of a standard sample; $conc_{STD}$ is the percent concentration of a standard sample; $O.D._{sample}$ is the optical density of the sample under test; and $conc_{sample}$ is the percent concentration of the sample under test.

From the above equations, it will be evident that by providing an exponential ramp curve in the circuit of FIG. 2, a logarithmic relationship between the output of the circuit, and the signal from the associated spectrophotometer may be achieved. This means that the circuit can be calibrated directly in "optical density." Also it is evident from the linear relationship shown in the equation of FIG. 2, that the "percent concentration" of the sample can very easily be determined either by direct calibration, or by simple proportions.

This is achieved by the logarithmic conversion circuit of FIG. 3. In the latter circuit, the ramp generator 108 is replaced by a capacitor C which is connected to one of the input terminals A of the comparator 106. The spectrophotometer 104 is connected through an amplifier 200 to the other input terminal B of the comparator. The gain of the amplifier 200 is adjustable by means, for example, of a potentiometer 202.

In the circuit of FIG. 3 the relay K1 has a pair of normally open contacts E which serve to connect the capacitor C to an adjustable grounded resistance R, and a pair of normally closed contacts E which serve to connect the capacitor C to a standard reference voltage level of, for example, 10 volts.

It is evident from the circuit shown in FIG. 3 that the capacitor C is charged to the 10-volt level, for example, by the reference voltage through the normally closed contacts E of the relay K1. Then, when the relay K1 is energized, the normally open contacts E close to permit the capacitor C to discharge through the resistor R. This discharge, as is well known, is along an exponential path, so that the relay K2 is energized by the comparator 106 after a predetermined number of pulses have been applied to the printer 18 in accordance with the logarithmic relationship represented by the exponential curve.

In operating the circuit of FIG. 3, a "blank" sample, such as pure water is tested first, which exhibits, for example, 100 percent optical transmission. The gain of the amplifier 200 is adjusted by adjusting the potentiometer 202, until the relay K2 is energized, indicating a comparison between the 100 percent transmission analog output from the spectrometer and the fully charged 10-volt level of the capacitor C. The gain is decreased slightly from this point so that the comparator is not quite tripped and K2 is deenergized.

The standard sample, having a transmission, for example, of a known percent which is less than 100 percent is then tested. The start switch 32 is then closed, so that the capacitor C discharges through the resistance R, until the exponentially decreasing voltage applied to the comparator is equal to the analog voltage from the spectrophotometer corresponding to the standard sample. Then, when the equality point is reached, the circuit operates in a manner similar to the circuit of FIG. 2, to cause the printer 18 to print, and the system to be reset for the next sample. The resistance R is then adjusted in the appropriate direction and successive measurements are made until the printed reading for the standard sample is the same as the known optical density or percent concentration of the standard sample. The unit is now calibrated and ready for operation.

The above described logarithmic type control circuit of FIG. 3 is shown in more detail in FIGS. 4 and 5. As shown in FIG. 4, for example, the amplifier 200 may be of the operational type. The output from the spectrophotometer 104 is applied to a pair of input terminals 300 of the amplifier, one of which is grounded. The ungrounded input terminal 300 of the amplifier is connected through a pair of resistors 302 and 304 to the negative input terminal of the operational amplifier 200. The resistor 302 may, for example, have a resistance of 2.2 kilohms, and the resistor 304 may have a resistance of 8.2 kilohms.

The junction of the resistors 302 and 304 is connected to ground through a pair of back-to-back diodes 306 and 308, these being shunted by a 5-microfarad capacitor 310. The resistors 302, 304 and the capacitor 310 form an appropriate 60-cycle filter, so that any 60-cycle interference is kept out of the amplifier circuit. The back-to-back diodes 306 and 308 prevent overload currents from reaching the amplifier 200 and damaging the amplifier.

The gain of the amplifier is set by the gain adjustment potentiometer 202 described in FIG. 3, which is controlled by the knob 38 of FIG. 1. The potentiometer may have a resistance, for example, of 500 kilohms, and it is in series with a 1 megohm resistor 312. The input and output of the operational amplifier is shunted by a 0.002-microfarad capacitor 314.

The coarse gain adjustment for the amplifier is provided, for example, by a series of resistors 316, 318, 319, 320, 321, 322, 323, 324, 325, 326, the latter resistor being grounded. These resistors are selectively switched into the circuit by appropriate switch contacts controlled, for example, by the knob 36 of FIG. 1.

The resistor 316 may have a value, for example, of 1.5 kilohms; the resistor 318 a value of 1 kilohm; the resistor 319 a value of 680 ohms; the resistor 320 a value of 470 ohms; the resistor 321 a value of 330 ohms; the resistor 322 a value of 220 ohms; the resistor 323 a value of 160 ohms; the resistor 324 a value of 110 ohms; the resistor 325 a value of 75 ohms; and the resistor 326 a value of 160 ohms.

The output from the amplifier 200, as described in conjunction with the circuit of FIG. 3 is applied to the input terminal B of the comparator 106, whereas the exponentially decreasing curve from the capacitor C of FIG. 3 is applied to the input terminal A; the capacitor C being shown in FIG. 5.

The comparator 106 in the circuit of FIG. 4 takes the form of a differential amplifier made up of a pair of PNP transistors 328 and 330. The input terminal B of the comparator is connected to the gate of a field effect transistor 332, whereas the input terminal A of the comparator is connected to the gate of a field effect transistor 334. The source electrodes of the field effect transistors are connected to the collector of a current stabilizing NPN transistor 336, the emitter of which is connected through a 3.9 kilohm resistor 338 to the output terminal of a negative 20-volt regulated direct-voltage source. The emitters of the transistors 328 and 330 are connected to the collector of a current-stabilizing PNP transistor 340, the emitter of which is connected through a 2.7-kilohm resistor 342 to the output terminal of a positive 20-volt regulated source.

A string of resistors 344, 346 and 348 having respective values of 4.7 kilohms, 33 kilohms and 4.7 kilohms are connected between the positive and negative outputs of the positive and negative 20-volt sources. The junction of the resistors 344 and 346 is connected to the base of the transistor 340, whereas the junction of the resistors 346 and 348 is connected to the base of the transistor 336. This circuit functions as a current control circuit, so as to assure that invariable currents are used to excite the transistors 328, 330, 332 and 334 in the comparator 106. The field effect transistors 332 and 334 provide a high input impedance to the comparator circuit, so that the loading on the two inputs will be reduced to a negligible level.

The transistors 328 and 330 have their base electrodes connected to the respective drain electrodes of the field effect transistors 332 and 334, and to the output terminal of the positive 20-volt source through respective resistors 350 and 352, each having a resistance, for example, of 15 kilohms. The collectors of the transistors 328 and 330 are connected to respective grounded resistors 354 and 356. These resistors may each have a value of 10 kilohms. The collector of the transistor 328 is also connected to the base of an NPN relay drive transistor 360. The collector of the transistor 360 is connected to the energizing coil of relay K2. The emitter of the transistor 360 is grounded.

The field effect transistors 332 and 334 may be included in an integrated circuit of the type presently designated SU2080. The PNP transistors 328, 330 and 340 may be of the type presently designated 2N3638. The relay drive transistor 360 may be of the type presently designated 2N3417, as may the transistor 336.

The circuit of the comparator 106 operates so that an energizing current flows through the transistor 360, when the comparison point between the signals applied to the input terminals A and B is reached. The comparator operates as a usual differential amplifier, and a detailed explanation of its function is deemed to be unnecessary.

In the circuit of FIG. 5, the printer 18 is shown as having a series of input terminals. The "digital reset" input terminal responds to an applied signal to return all the print wheels controlled by the solenoids 20, 24 and 28 in FIG. 2, to zero. The "specimen reset" input terminal responds to an applied signal to return the specimen or sample indicating print wheels mentioned previously in conjunction with FIG. 1 to zero. The "data digital" input terminal responds to the aforesaid digitized pulses to step the print wheels from position to position in the manner described above. The "data specimen" input terminal responds to pulses to step the sample, or specimen, identifying print wheels from one position to the next. The "print" input terminal responds to a signal to move the previously set print wheels to a printing position with respect to the tape.

The contacts E of the relay K1 are connected as before, except that a coarse and fine control for the value of the resistance R is provided. That is, the normally open contacts E are connected to a chain of 1 megohm resistors 400, 402, 404, 406, 408, 412, 414, 416. These resistors are switched by the control 40, for example, described in conjunction with FIG. 1 for a coarse control for R, whereas the fine control is provided by a potentiometer 418 which, as shown, is controlled by the control 42 of FIG. 1.

The switch 50 in FIG. 1 may also be provided with an "up" position to constitute a manual reset switch, designated by the reset switch 50' in FIG. 5. In the circuit of FIG. 5, the holding contacts C of the relay K1 are connected directly to the negative terminal of the 24-volt source, and the thermal relay K3 is not used. A diode 420, instead, is connected across the relay coil of the relay K1, and this diode serves to hold the relay K1 energized for a sufficient time after comparison has been reached in the comparator, so as to permit the printing operation by the printer 18 to be carried out, without the need for the thermal relay K3 to provide the required delay.

The aforesaid specimen advance and reset switch 34 is connected as shown into the circuit of FIG. 5. That is, when the specimen reset switch 34 is moved down to its "reset" position, the switch 34a in the circuit of FIG. 5 closes and, if the relay K1 is deenergized, the specimen indicating print wheels are reset to zero. It will be remembered that each time the relay K1 is deenergized, the print wheels described in FIG. 2 are reset, so that the printer will be ready for the next sample, or specimen. However, it is not desirable for the specimen indicating print wheels also be reset at this time, since they are required to identify by successive numbers the successive samples. However, when a set of tests has been completed, the switch 34a is closed, so that the specimen indicating print wheels may also be reset.

Each time the relay K1 is energized, the specimen indicating print wheels are moved from one position to the next, this being achieved by the resulting pulse applied through a diode 422 to the "data specimen" input terminal of the printer. Also, when the switch 34 of FIG. 1 is moved up to its "advance" position, the circuit to the "data specimen" input terminal may be completed at any time to advance the specimen indicating print wheels to their next position manually.

The operation of the circuit shown in FIGS. 4 and 5 is similar to that described in conjunction with FIG. 3. Prior to the test, an appropriate value for the capacitor C of FIG. 5 is selected, and an appropriate "R" is established by the adjustment of the controls 40 and 42. Initially a blank sample composed, for example, of pure water, is tested so that the printer may be calibrated, as described above, to establish the point corresponding to 100 percent T. Then the standard sample having, for example, an impurity concentration of 160 milligrams percent is tested, and R is adjusted so that the printer will provide a reading corresponding to that concentration. For example, the R may be set so that the printer provides a reading of 160 for that particular sample. Now the instrument is ready to measure any percent concentrations at the particular wavelength of light used in the spectrophotometer; it being assumed that there is a linear relationship in optical densities and percent concentration, which is true for all practical standpoints, especially in a limited range.

As indicated above, other circuits can also be used to replace the linear circuit of FIG. 2 or the logarithmic circuit of FIG. 3. For example, a control circuit may be provided in which the capacitor C is charged through the resistor R during the operational cycle, rather than discharged, so as to provide an exponentially increasing signal with an inverse logarithmic effect. This latter effect is useful, for example, in determining the bleaching action on a particular sample.

It will be appreciated, therefore, that while particular embodiments have been shown and described, modifications may be made. The following claims are intended to cover all such modifications.

I claim:

1. An electronic readout instrument to be connected to alternating current mains of an established frequency for providing output readings in response to analog input signals, said output readings being related on a logarithmic scale to said analog input signals, said readout instrument including: an input circuit for receiving the analog input signals; digitizing circuit means including rectifier means connected to the aforesaid mains for producing a train of pulses having a frequency corresponding to the frequency of the alternating current from said mains; a display unit including a pulse-actuated counter means and capable of displaying readings corresponding to the counts of said counter means; gate circuit means interposed between said digitizing means and said display unit for controlling the introduction of said pulses from said digitizing circuit means to said counter means in said display unit, ramp signal generating means for producing a ramp signal exhibiting an exponential time/amplitude characteristic; start circuit means coupled to said exponential ramp signal generating circuit means for initiating said exponential ramp signal and for simultaneously enabling said gate circuit to initiate the application of said pulses from said digitizing circuit means through said gate circuit to said counter means in said display unit; comparator circuit means coupled to said input circuit and to said ramp signal generating means for providing an output after the amplitude of said ramp signal has varied exponentially to reach a predetermined relationship with respect to the analog input signal received by said input circuit; and circuit means coupled to said comparator circuit and to said gate circuit to disable said gate circuit and thereby terminate the application of said pulses from said digitizing circuit means to said counter means in said display unit when said ramp signal amplitude has varied exponentially to reach the aforesaid predetermined relationship.